United States Patent Office 3,063,915
Patented Nov. 13, 1962

3,063,915
DIAGNOSTIC COMPOSITION AND METHOD FOR DETERMINING PROTEASE ACTIVITY
Ernest C. Adams, Jr., Elkhart, Ind., assignor to Miles Laboratories, Inc., Elkhart, Ind., a corporation of Indiana
No Drawing. Filed Oct. 17, 1958, Ser. No. 767,789
8 Claims. (Cl. 195—103.5)

This invention relates to a new diagnostic composition and to a colorimetric method for the measurement of protease activity in gastric contents, in urine, or in other body fluids or tissues or in plant extracts. More particularly, it relates to the determination of pepsin and uropepsin activity.

Uropepsin in urine and pepsin in gastric contents are indicators of gastric secretory activity for which clinical significance has been established. Increased amounts of uropepsin in urine have been found to be indicative of gastric irritations, duodenal ulcers, and other gastroenteric ailments, while decreased amounts are characteristic of gastric anacidity.

Prior art methods for the measurement of such protease activity have been of two types:

A. Digestion of protein followed by measurement of an end product of the digestion such as tyrosine as in the Anson-Mirsky method, or by some property change such as viscosity of the protein solution.

B. Precipitation of paracasein from homogenized milk or casein solution with the precipitation time being a measure of protease activity.

Both methods have inherent disadvantages. The former is complex, time consuming, and has relatively high blanks in the case of tyrosine measurements. Also, certain drug metabolites interfere. The latter is complex and the end point is often indistinct. The reaction is not carried out at the optimum pH for pepsin and it is also doubtful whether it is a true measure of pepsin activity as other enzymes, such as cathepsin and the like, precipitate paracasein.

Thus, it is an object of this invention of provide a simple one-step colorimetric method for determining protease activity, which is particularly applicable to the determination of pepsin in gastric contents and uropepsin in urine.

The principle underlying the present invention is the phenomenon of "protein error" exhibited by certain indicators whereby, in the presence of proteins, such indicators will undergo their characteristic color changes at lower pH values than that at which they will change color in the absence of protein. That is to say, an indicator which exhibits protein error will, in a solution containing protein, by its color indicate a higher pH value for such solution than is actually the case, and the extent to which the characteristic color change point of the indicator is shifted is some indication of the amount of protein in the solution.

This application is parallel to the copending application Serial No. 585,977—filed by Alfred H. Free and Mary Lou Kercher on May 21, 1956, and assigned to the assignee of this application—wherein the phenomenon of protein error is also the pivotal feature. However, while the objects of that invention are accomplished by measuring protein (albumin) as such in accordance with the principle: the more protein, the more protein error, the practice of the present invention consists of determining protease activity by tracing the gradual disappearance of protein with concomitant lessening of the protein error effect. In other words, the phenomenon of protein error offers a means for following the digestion of protein by proteases. As the protein is digested, the color of the indicator will shift from one exhibited in the presence of protein toward one shown in its absence. The color reached at a specified time or, conversely, the time required to reach a specified color is a measure of the protease activity.

Obviously, the most sensitive method will be one in which the indicator chosen changes color at a pH close to the optimal pH for the particular protease. However, this does not preclude using, with a suitable buffer, an indicator which changes at a pH value different from the optimum of that of the protease, as long as the enzyme has some activity at the chosen pH. For pepsin and uropepsin the logical choices of indicators are those that change at pH values of 1 to 2, and preferably at 1.5, such as Orange IV, metanil yellow, thymol blue, and the like. These enumerated dyes exhibit a yellow color in the presence and a red color in the absence of protein at a pH of 1.5. When a solution of the indicator or the protein is incubated with pepsin or uropepsin, the dye becomes increasingly red. The increase in optical density is thus a measure of the proteolytic activity. Alternatively, bromphenol blue buffered at pH 2.8 may be used. Generally speaking, any indicator changing color at a suitable pH could be substituted for those listed. The system should be buffered near the change point of the indicator, and as buffer hydrochloric acid, citric acid, cyclohexanesulfamic (hexamic) acid, etc., may be used for pH adjustment at from 1 to 2 and preferably at 1.5.

While in the following examples, albumin has been chosen as the protein reagent, other proteins such as hemoglobin, globulin, mucin, casein, etc., are suitable as long as they exhibit a measurable protein error with an indicator and are digested by the particular protease. Similarly, while the practice of this invention is primarily directed to a determination of pepsin and uropepsin, the methods disclosed herein can also be applied to the measurement of other proteases such as trypsin, chymotrypsin, ficin, papain, etc., provided that the indicator chosen changes color at a pH at which the enzyme is active and that a suitable buffer for the optimum pH is selected.

As shown by the following examples which are illustrative of the compositions of the invention and of the methods of preparing them, embodiments of this invention may take the form of a solution, an impregnated stick, a powder or a tablet.

*Example 1*

Reagent: Orange IV-albumin solution.

Five ml. of concentrated hydrochloric acid, together with approximately 700 ml. of water, is delivered into a 1000 ml. volumetric flask. Fifteen mg. Orange IV (Tropaolin OO-National Aniline, C.I. No. 143) and 150 mg. of albumin (Armour, Bovine Fraction V) are placed into a 50 ml. beaker. One ml. of distilled water is added and the mixture pasted. More water is gradually added and the mixture transferred to a larger container. The final volume is about 100 ml. This is added to the above dilute acid solution. The container is washed out and the washings also added to the dilute acid. The solution is brought to a total volume of 1000 ml. and filtered.

Method: Twenty ml. of the urine is acidified to pH 1.5 with 6 N hydrochloric acid and diluted to 25 ml. with 0.06 N hydrochloric acid. Blank tubes and color tubes are prepared as follows:

| Blank tube | Color tube |
| --- | --- |
| 10 ml. Orange IV-albumin solution. 1 ml. 0.06 N hydrochloric acid | 10 ml. Orange IV-albumin solution. 1 ml. acidified urine. |

The color tubes are read against the blank tube in a suitable colorimeter at a wave length of 530 to 540 millimicrons, after incubation for a specified time. The increase in optical density is a measure of the protease activity.

Example II

Reagent: Metanil yellow-albumin solution.

This is prepared in the same manner as the Orange IV-albumin reagent using metanil yellow (National Aniline, C.I. No. 138) in place of the Orange IV.

Method: The procedure described in Example I is followed.

Example III

Reagent: Thymol blue-albumin reagent.

This is prepared in the same manner as that illustrated by Example I using thymol blue (thymol sulfon phthalein, National Aniline) in place of Orange IV.

Method: The method is identical to that cited in Example I, using the thymol blue-albumin reagent instead of the Orange IV-albumin reagent.

Example IV

Reagents:

A. *Citrate buffer-bromphenol blue solution.*—One hundred-fifty mg. of bromphenol blue (Coleman and Bell) is dissolved in 1 ml. of 0.1 N sodium hydroxide and diluted to 10 ml. with distilled water. This solution is mixed with 10 ml. of 10 N citric acid and diluted to 100 ml. with distilled water. Fifty ml. of 0.2 N citric acid is mixed with 5 ml. of 0.2 N sodium hydroxide and diluted to 100 ml. with distilled water. The pH is checked and adjusted to 2.8 if necessary. Two ml. of the above bromphenol blue solution is diluted to a volume of 100 ml. with citrate buffer described above.

B. *Protein solution.*—Five hundred mg. serum albumin (Armour, Bovine Fraction V) is dissolved in distilled water and diluted to 100 ml.

Method: One ml. of urine is added to 10 ml. of the citrate buffer-dye solution (Reagent A) in a test tube and mixed well. One ml. of albumin solution (Reagent B) is added and the color is read in a colorimeter at a wave length of 600 millimicrons against a blank containing 10 ml. of Reagent A and 2 ml. of water. The solution is incubated at 37° C. and read again at 30, 60 and 120 minutes. The decrease in optical density is a measure of the protease activity.

Example V

For determination of gastric pepsin, 1 ml. of 1 to 100, up to 1 to 500, dilution of gastric juice in 0.6 N hydrochloric acid is added to 10 ml. of any of the dye reagents described in the first three examples and determinations made as previously described. For the bromphenol blue reagent the dilution of gastric juice should be made in the pH 2.8 citrate buffer described in Example IV.

Example VI

One hundred-fifty mg. bromphenol blue (Coleman and Bell) is dissolved in 1 ml. of 0.1 N sodium hydroxide and diluted in 10 ml. with distilled water. This solution is added to 10 ml. of 10 N citric acid and made up to a total volume of 100 ml. with distilled water. Four ml. of this solution is diluted to 250 ml. with pH 2.8, 0.1 N citrate buffer. To 20 ml. aliquot of this buffer dye solution is added 5 to 50 mg. serum albumin (Armour, Bovine Fraction V). Bibulous strips are then impregnated with this solution and dried. The dried strips in contact with protease will change from blue to green.

Example VII

A powder with the following composition is prepared:

Albumin (Bovine, Fraction V) _____ mg __ 150
Orange IV _____ mg __ 15
Citric acid _____ gm __ 5

This powder is added to urine at a level of 500 mg. per 5 or 10 ml. As the solution stands, it becomes redder as the albumin is artificially digested.

This pulverized composition may also be used for the compounding of tablets as another convenient embodiment of this invention.

It is to be understood that the description and examples set forth hereinabove are intended to define and illustrate, but not to limit the invention to the particular reagents or proportions set forth therein.

Any of the reagents described above may be made more sensitive by decreasing the amount of protein or less sensitive by increasing the protein.

For example, the following variations in amounts of components are permissible: protein: from 0.01 to 1.00 wt. percent; indicator: from 0.0005 to 0.005 wt. percent. However, it should be noted that 0.015 wt. percent of the protein and 0.0015 wt. percent of the indicator make for optimum content of these respective ingredients.

Instead of using a colorimeter, visual comparisons with appropriate color standards can also be made within the purview of this invention.

In summary, the present invention pertains to a colorimetric diagnostic method for the determination of protease activity in body fluids and especially of uropepsin activity in urine and pepsin activity in gastric contents. This method is based on the phenomenon of protein error exhibited by certain indicators in the presence of protein. The system is buffered to maintain an optimal pH of 1.5. The preferred embodiment of this invention comprises as ingredients albumin, Orange IV and hydrochloric acid.

What is claimed is:

1. A diagnostic composition for determining protease activity in biological fluids comprising a bibulous carrier impregnated with a solution consisting essentially of 0.01 to 1.00 wt. percent of a protein and from 0.0005 to 0.005 wt. percent of a dye indicator buffered within a pH range of from 1 to 2, within which range the protease is active and the indicator exhibits protein error.

2. A diagnostic composition for determining protease activity in biological fluids comprising essentially, in solid form, from 1.00 to 10.00 wt. percent of a protein and from 0.10 to 1.00 wt. percent of a dye indicator buffered within a pH range of from 1 to 2, within which range the protease is active and the indicator exhibits protein error.

3. A method for determining protease activity in biological fluids which comprises contacting said fluid with a solution comprising a protein, an acid buffer having a pH range corresponding to that at which the protease is active, a dye indicator which exhibits protein error at a pH under conditions in which the protease activity is active, said indicator changing color as the protein is digested by the protease and measuring the time required to reach a specific color.

4. A method for determining protease activity in biological fluids which comprises contacting said fluid with a solution comprising from 0.01 to 1.00 wt. percent of a protein and from 0.0005 to 0.005 wt. percent of a dye indicator buffered within a pH range of from 1 to 2, within which range the protease is active, said indicator exhibiting protein error and changing color as the protein is digested by the protease and measuring the time required to reach a specific color.

5. A method according to claim 4 wherein the protein is selected from the group consisting of albumin, hemoglobin, globulin, mucin and caesin, wherein the dye indicator is a member of the group consisting of Orange IV, metanil yellow and thymol blue and wherein the buffer is taken from the group consisting of hydrochloric acid, citric acid and cyclohexanesulfamic acid.

6. A method for determining protease activity in biological fluids which comprises contacting said biological fluid with a solution comprising 0.015 wt. percent of albumin and 0.0015 wt. percent of Orange IV buffered by means of hydrochloric acid at a pH of 1.5 at which the protease is active and the indicator exhibits protein error, said indicator changing color as the protein is digested by the protease and determining the color change after specified periods of digestion.

7. A method for determining uropepsin activity in urine which comprises contacting said urine with a solution comprising 0.015 wt. percent of bovine serum albumin and 0.0015 wt. percent of Orange IV buffered by means of hydrochloric acid at a pH of 1.5 at which the protease is active and the indicator exhibits protein error, said indicator changing color as the protein is digested by the uropepsin and determining the color change after specified periods of digestion.

8. A method for determining pepsin activity in gastric fluids which comprises contacting said gastric fluid with a solution consisting essentially of 0.015 wt. percent of bovine serum albumin and 0.0015 wt. percent of Orange IV, buffered by means of hydrochloric acid at a pH of 1.5 at which the protease is active and the indicator exhibits protein error, said indicator changing color as the protein is digested by the pepsin present in the gastric fluid and measuring the color change after specified periods of digestion.

References Cited in the file of this patent

UNITED STATES PATENTS 327,567    Manwaring _____ Oct. 6, 1885

OTHER REFERENCES

Acid-Base Indicators, Kolthoff and Rosenblum, The Macmillan Company, 1937, p. 368.

Feigl et al.: Mikrochimica Acta, vol. II, 1937, pages 107–110.

Crystalline Pepsin, I. Isolation and Tests of Purity, John H. Northrop, The Journal of General Physiology, vol. 13, No. 6, July 20, 1930, pages 739–765.

"Food Research," vol. 21, No. 2, March–April 1956, pp. 270–272.